May 14, 1929.                    C. J W. CLASEN                    1,712,750
                                 RAILWAY CAR TRUCK
                              Filed Feb. 25, 1928          2 Sheets-Sheet 1.

INVENTOR
C. J. W. Clasen
BY
Evans + McCoy
ATTORNEYS

May 14, 1929.    C. J. W. CLASEN    1,712,750
RAILWAY CAR TRUCK
Filed Feb. 25, 1928    2 Sheets-Sheet 2

INVENTOR
C. J. W. Clasen
BY
Evans & McCoy
ATTORNEYS

Patented May 14, 1929.

1,712,750

UNITED STATES PATENT OFFICE.

CLAUS J. WERNER CLASEN, OF DAVENPORT, IOWA, ASSIGNOR TO THE BETTENDORF COMPANY, OF BETTENDORF, IOWA, A CORPORATION OF IOWA.

RAILWAY-CAR TRUCK.

Application filed February 25, 1928. Serial No. 256,946.

This invention relates to railway car trucks and has for its object to provide a truck of simple, rugged and relatively inexpensive construction in which rail friction and tread wear are reduced to a minimum by mounting the supporting wheels for free rotation on their axles.

A further object of the invention is to utilize the truck axles not only for mounting the supporting wheels but also as frame members providing rigid connections between the side frame members.

A further object is to provide a truck in which each wheel is rotatably mounted on its axle and is securely held against lateral movement on the axle.

A further object is to provide a construction of the character above described in which the wheels, axles and other parts of the truck are readily removable for replacement or repair.

A further object is to provide a construction which permits the use of independent seats for bolster springs at opposite sides of the truck frame making it unnecessary to provide a rigid cross member such as a spring plank between central portions of the side frame members.

A further object of the invention is to provide a truck of the character above described in which longitudinal frame members are provided to the inner and outer sides of the wheels at each side of the truck, in which the frame members are rigidly attached to the axles and in which provision is made for suspending the brake beams from the ends of the frame members.

With the above and other objects in view, the invention may be said to comprise the truck as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which.

Figure 1:
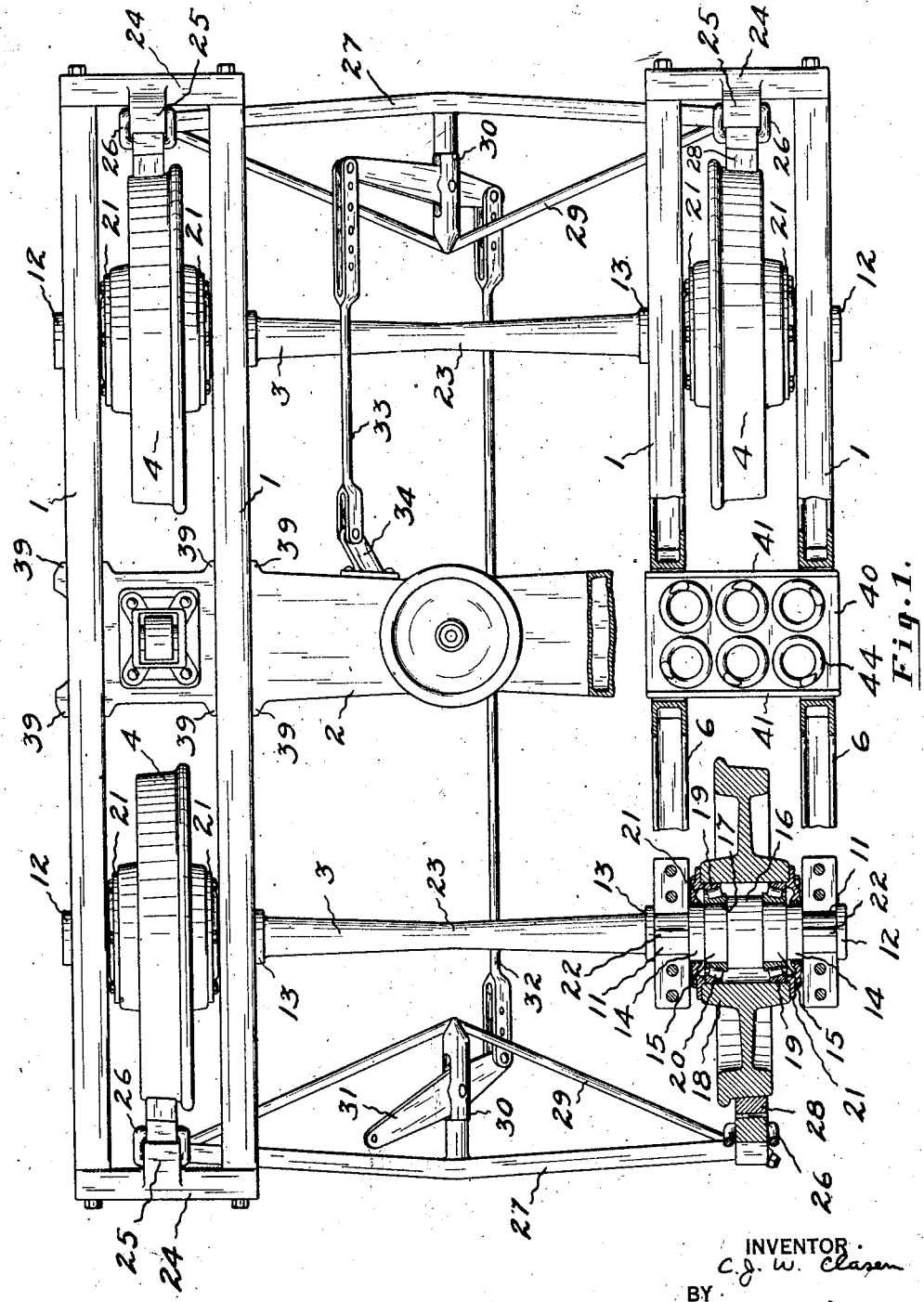
Figure 1 is a plan view partially broken away to show the bolster guides and wheel mounting.
Figure 2:
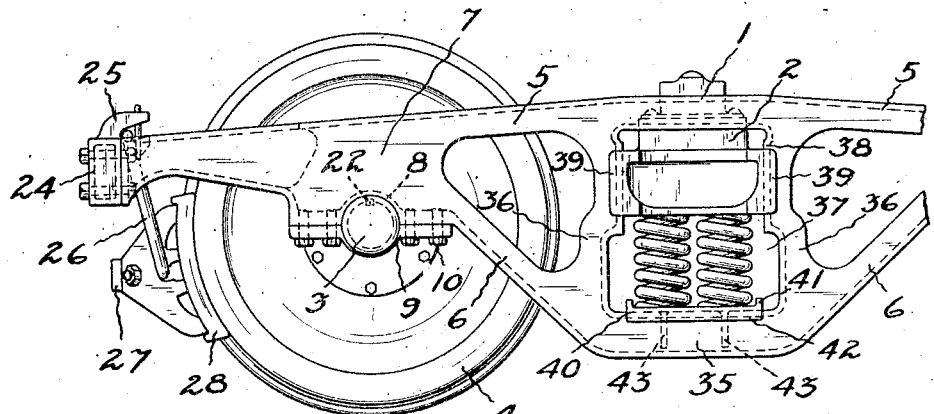
Fig. 2 is a side elevation of the truck.
Figure 3:
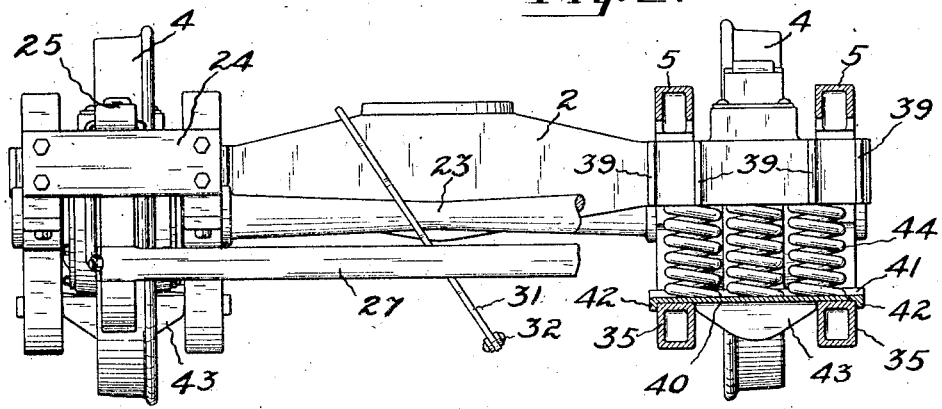
Fig. 3 is an end elevation of the truck, partly in section.

As shown in the accompanying drawings, the truck is provided with longitudinal frame members 1 arranged in pairs at opposite sides of the truck and also with a bolster 2 extending transversely between the central portions of the frame members. The frame members are connected by transverse axles 3 which carry the supporting wheels 4, which are positioned between the frame members of each pair at opposite sides of the truck.

Each of the longitudinal frame members 1 is of truss form having a compression chord 5 and a tension chord 6 which merge into end portions 7 which overlie the axles 3. The end portions 7 of the frame members are provided on the under sides thereof with half bearings 8 to receive the axles and the axles are held in place by means of removable half bearings 9 which fit upon the under sides of the axles and are detachably secured to the end portions 7 of the frame members by bolts 10.

The axles 3 have portions 11 of reduced diameter which fit in the bearings of the frame members and the axle is held against endwise movement in the frame members by shoulders 12 at their outer ends which engage the outer of the longitudinal frame members and shoulders 13, which engage the inner faces of the inner longitudinal frame members. Between the longitudinal frame members of each pair, the axle has portions 14 adjacent the reduced portions 11 which are of greater diameter than the reduced portions and provide shoulders engaging the frame members on the sides thereof opposite those engaged by the shoulders 12 and 13. Between the two shoulder portions 14 at each end, the axle has seating portions 15 of greater diameter than portions 14 which are separated by a central collar or enlarged portion 16 which provide seats for race rings 17 which encircle the portions 15 and bear against the central collar 16. Each of the wheels 4 is provided with a hub 18 which has upon the interior thereof, a pair of race rings 19 which encircle the race rings 17. In assembling the wheels upon the axles, the central collar 16 may be slipped on the axle after the inner bearings have been applied, after which the outer bearings are secured in place.

The race rings 17 and 19 have opposed faces of conical form and receive between them conical bearing rollers 20. The hubs 18 also carry oil retaining rings 21 which are bolted to the opposite ends thereof and closely overlie the shoulder portions 14. The axes of the bearing rollers 20 are inclined in opposite directions in the two races and the race rings 17 are held against lateral movement on the axle by central collars 16 on the axle so that the wheels are positively held against lateral movements on the axle. Wheels are thus mounted for rotation on the axles and the axles are held against rotation in the frame members by means of keys 22 which engage in seats in the half bearings 8 of the frame members. Since the axles are not subjected to the usual torsional stresses, they may be made considerably lighter than is necessary when the supporting wheels are fixed to the axles. The wheels are mounted for independent rotation on the axles and since the wheels are mounted between pairs of adjacent side frames, the only portions of the axles subjected to bending forces due to vertical load are those between the adjacent side frames, and consequently the intermediate portions 23 of the axles may be reduced in diameter.

As shown in Fig. 1 of the drawing, the central portions 23 of the axles may be of a diameter considerably less than that of the end portions upon which the wheels are mounted.

The end portions 7 of the frame members project past the front and rear wheels in order to provide supports for the brake beams in advance of the front wheels and to the rear of the rear wheels. The ends of the frame members of each pair may be connected by short bars 24 and these bars may be provided with integral brackets 25 which form supports for links 26 by which brake beams 27 are suspended from the frame. The brake beams 27 carry brake shoes 28 at their opposite ends and each is provided with a truss rod 29 and a central strut 30 interposed between the brake beam and truss rod. The brake beams are simultaneously actuated to apply the brake shoes to the wheels by means of levers 31 pivoted to the struts 30 and having their lower ends connected by a connecting rod 32. The upper end of one of the levers is connected by an adjustable link 33 to a bracket 34 on the bolster and the upper end of the other lever may be connected to suitable actuating mechanism on the car.

The tension chord 6 of each of the longitudinal frame members 1 is inclined downwardly at each end from the end portions 7 to a central horizontal portion 35 and at opposite ends of this horizontal portion, the tension and compression chords are connected by integral vertical columns 36. The columns 36 are spaced apart sufficiently to provide between them a bolster opening 37 and have inwardly offset upper portions 38 forming bolster guides. The bolster 2 extends through the openings of the frame members at each side of the truck and is provided with guide ribs 39 which overlie the inner and outer sides of the guide portions 38 of each of the columns 36. The rigid connection between the longitudinal frame members at opposite sides of the truck provided by the axles 3 makes it unnecessary to provide a rigid tie between central portions of the frame members and the usual spring plank is therefore replaced with separate spring seats 40, each of which is supported on the horizontal portions 35 of the tension chords of the two frame members at each side of the truck. The spring seats 40 are of channel shape having vertical side flanges 41 and downturned end flanges 42, which engage the outer sides of the tension chords. The spring seats are additionally strengthened by bottom ribs 43 formed integrally with the spring seat and terminating short of the ends thereof to provide spaces between the ends of the ribs 43 and the flanges 42 to receive the horizontal portions 35 of the tension chords. The seats 40 may be made of a width and length to receive any desired number of bolster supporting springs 44, which are interposed between the spring seats and the under side of the bolster.

Figure 4:
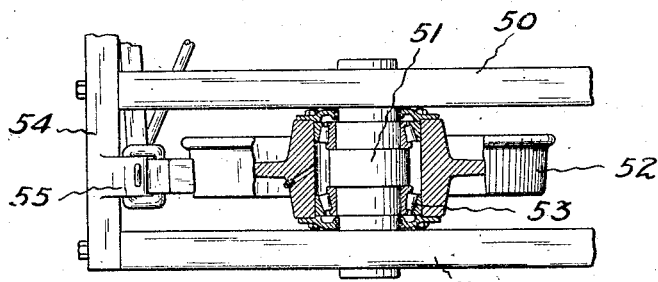
Fig. 4 is a fragmentary view of one corner of the truck, partly in section, showing a modified form.

Fig. 4 of the drawing shows a modification of the invention in which longitudinal frame members 50 are arranged in pairs on opposite sides of the truck and have fixed thereto short axles 51 upon which are rotatably mounted supporting wheels 52. The short axles are fixed to the frame members and the wheels 52 are mounted between the frame members of each pair on roller bearings 53. In this modification, the longitudinal frame members of the truck are spaced and connected by end cross bars 54 which provide the connection between the frame members. The cross bars 54 may be secured in any suitable manner to the ends of the frame members 50 forwardly of the front wheels and rearwardly of the rear wheels and may be provided adjacent opposite ends with integral brackets 55 from which the brake beams may be suspended.

Figure 5:
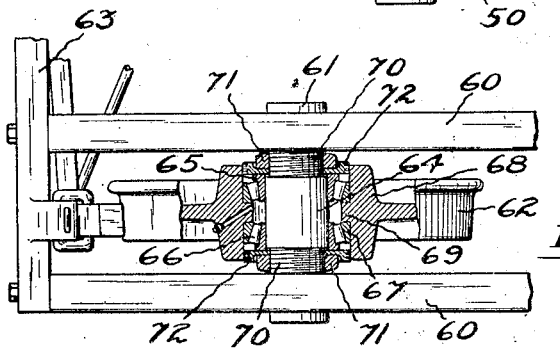
Fig. 5 is a fragmentary view of one corner of the truck, partly in section, showing a further modified form.

Fig. 5 of the drawing shows a modification of the invention in which the longitudinal frame members 60 are arranged in pairs on opposite sides of the truck, the frame members of each pair being connected by short axles 61, rigidly secured thereto. The supporting wheels 62 are rotatably mounted on the axles 61 and the rigid connection between the frame members at opposite sides of the truck is provided by end cross bars 63 connected by any suitable means to the ends of the frame members 60. Each axle 61 is provided midway between its ends with a portion 64 adapted to receive race rings 65 which are oppositely tapered to provide races for conical rollers 66. Outer race rings 67 are secured in the hub 68 of the wheel on opposite sides of a central inwardly projecting spacing rib 69 on the interior of the hub. On opposite sides of the central portion 64, the axle has threaded portions 70 which receive nuts 71 which serve to clamp oil retaining rings 72 against the inner race rings 65, the oil retaining rings 72 having a close working fit within opposite ends of the hub 68 of the wheel. The nuts 70 serve to hold the inner race rings 65 against the thrust exerted through the rollers 66 and prevent lateral movements of the wheel on the axle.

It will be apparent that the present invention provides a relatively light truck which possesses great strength, that the mounting of the axles in the frame members makes it simple matter to remove the wheels and axles for repair and replacement of wheels or bearings and that since the wheels are freely rotatable upon their axles, each wheel independently of the others, rail friction and tread wear will be reduced to a minimum.

It is also obvious that the keys 12 may be mounted in the keyways with a slight clearance to permit a partial rotation of the axles to allow one corner of the truck to negotiate uneven joints in the track without creating excessive torsional stresses in the axle. It is to be noted, however, that such keys will limit rotation of the axles and the axles provide rigid cross connections between the frame members.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A railway car truck having front and rear axles, supporting wheels rotatably mounted on the axles, four longitudinal frame members arranged in pairs on opposite sides of the truck, said frame members being secured to said axles and held against movement longitudinally of the axles, a bolster yieldably supported by the frame members and held against longitudinal movement whereby horizontal thrusts from the bolster are transmitted to the four frame members.

2. A railway car truck having a pair of longitudinal frame members at each side thereof, transversely extending axles secured at their ends to the longitudinal frame members and rigidly connecting the frame members against movement longitudinally of the axles, wheels mounted on said axles for independent rotation, and roller bearings interposed between the wheels and axles.

3. A railway car truck having a pair of longitudinal frame members at each side thereof, transversely extending axles secured at their ends to the longitudinal frame members and rigidly connecting the frame members against movement longitudinally of the axles, wheels mounted on said axles for independent rotation, anti-friction bearings interposed between the wheels and axles, and means for securing the bearings in fixed positions on said axles.

4. A railway car truck having a pair of longitudinal frame members at each side thereof, transversely extending axles adjacent the front and rear of the truck, each axle being connected at its ends to said frame members, and providing a rigid connection between said members against movement longitudinally of the axle, wheels mounted for independent rotation on each axle adjacent the opposite ends thereof, and anti-friction bearings interposed between each wheel and axle.

5. A railway car truck having a pair of longitudinal frame members at each side thereof, transversely extending axles adjacent the front and rear of the truck, each axle being connected at its ends to said frame members, and providing a rigid connection between said members against movement longitudinally of the axle, wheels mounted for independent rotation on each axle adjacent the opposite ends thereof, anti-friction bearings interposed between each wheel and axle, a bolster slidably mounted in the frame members centrally thereof, and means for yieldably supporting the bolster on said frame members.

6. A railway car truck having a pair of longitudinal frame members at each side thereof, transversely extending axles fixed at their ends to longitudinal frame members and rigidly connecting the frame members, said axles having enlarged portions between the pairs of frame members, anti-friction bearings mounted on said enlarged portions and held against movement along the axle, and independently rotatable supporting wheels mounted on said bearings.

7. A railway car truck having front and rear axles, anti-friction bearings carried by said axles, independently rotatable supporting wheels mounted on said bearings, a pair of longitudinal side frame members at each side of the truck overlying said axles and having half bearings to receive said axles, complemental half bearings detachably secured to said frame members, and means for securing the axles against rotation in said frame members.

8. A railway car truck having front and rear axles, anti-friction bearings carried by said axles, supporting wheels rotatable on said bearings, a pair of longitudinal side frame members at each side of the truck overlying said axles and having half bearings to receive said axles, complemental half bearings detachably secured to said frame members, shoulders on the axle engaging the frame members to hold the axle against endwise movement in the frame members, and keys for limiting rotation of the axles in the frame members.

9. A railway car truck having axles, supporting wheels rotatably mounted on anti-friction bearings on said axles, and longitudinal frame members connected to the ends of said axles and spaced thereby, said frame members extending past the front and rear wheels to provide brake beam supports in advance of the front wheels and to the rear of the rear wheels.

10. A railway car truck having at each side thereof, a pair of spaced longitudinal frame members, axles secured to and holding said frame members in spaced relation, and supporting wheels rotatably mounted on anti-friction bearings on the axles between the longitudinal frame members of each pair.

11. A railway car truck having front and rear axles, supporting wheels rotatably mounted on anti-friction bearings on the axles adjacent the ends thereof, a pair of longitudinal frame members at each side of the truck secured to said axles, the frame members of each pair lying upon opposite sides of front and rear supporting wheels, said frame members having alined bolster receiving openings, a bolster having its ends extending into said openings, a spring seat carried by each pair of frame members, and bolster supporting springs carried by each spring seat.

12. A railway car truck having front and rear axles, supporting wheels rotatably mounted on anti-friction bearings on the axles adjacent the ends thereof, longitudinal frame members of truss form at opposite sides of the truck, each having tension and compression chords merging into end portions which overlie the axles and extend past the front and rear wheels to provide brake beam supports, said end portions being secured to the axles and holding them in spaced relation.

In testimony whereof I affix my signature.

CLAUS J. WERNER CLASEN.